June 19, 1934.      R. GUNN      1,963,551
INDUCTOR COMPASS
Filed Nov. 12, 1929      5 Sheets-Sheet 3
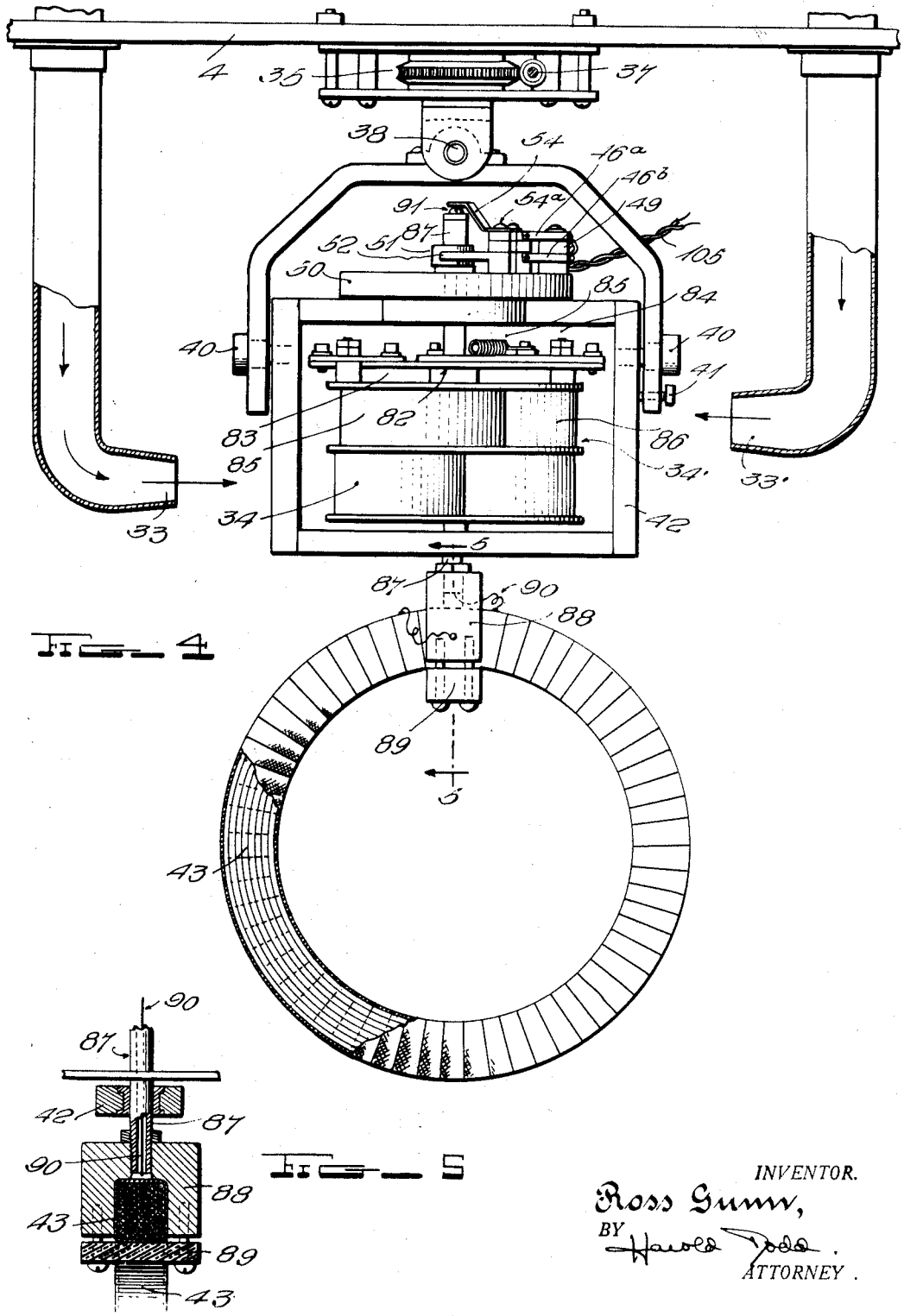
INVENTOR.
Ross Gunn,
BY Harold Todd
ATTORNEY.

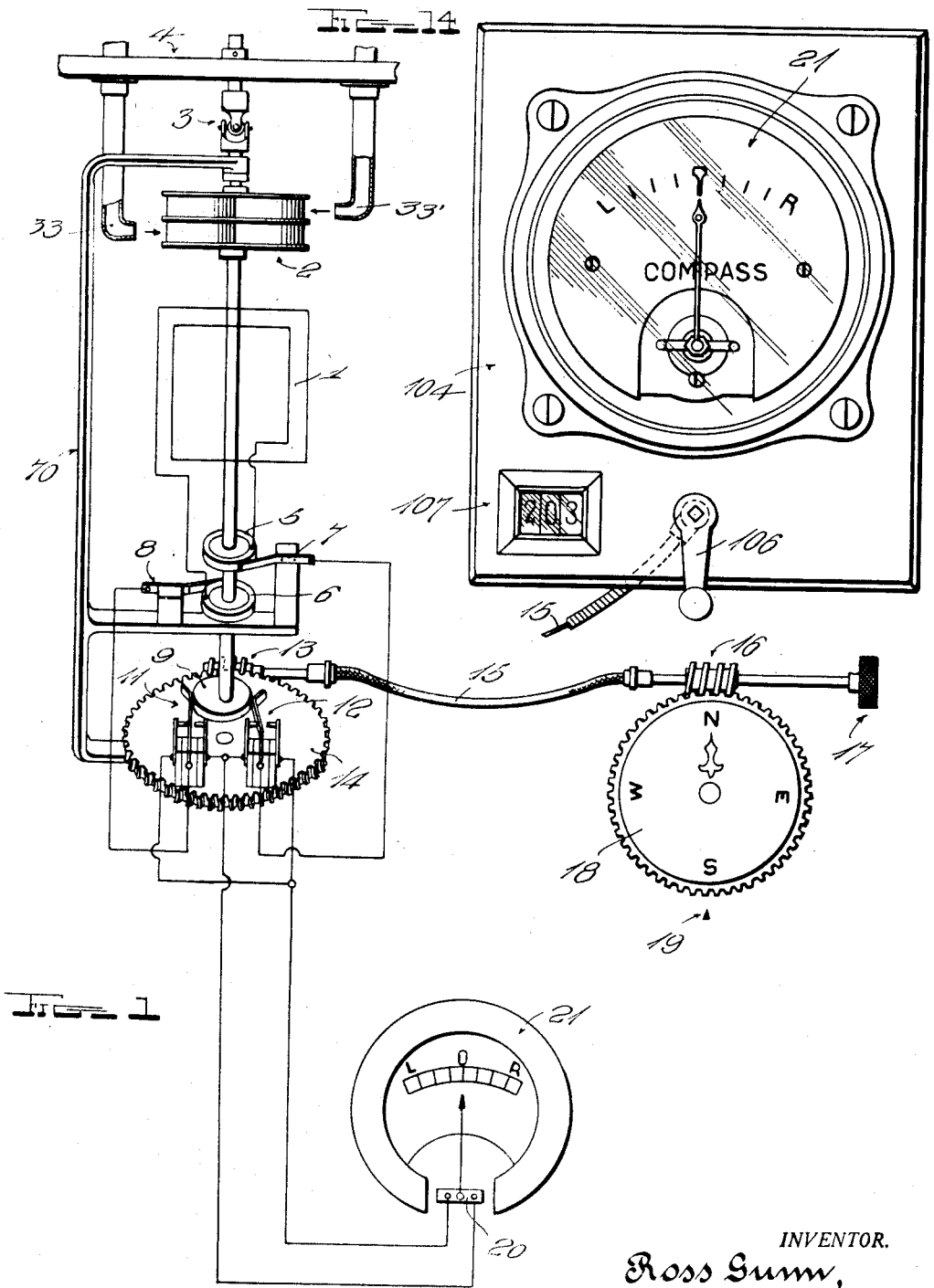

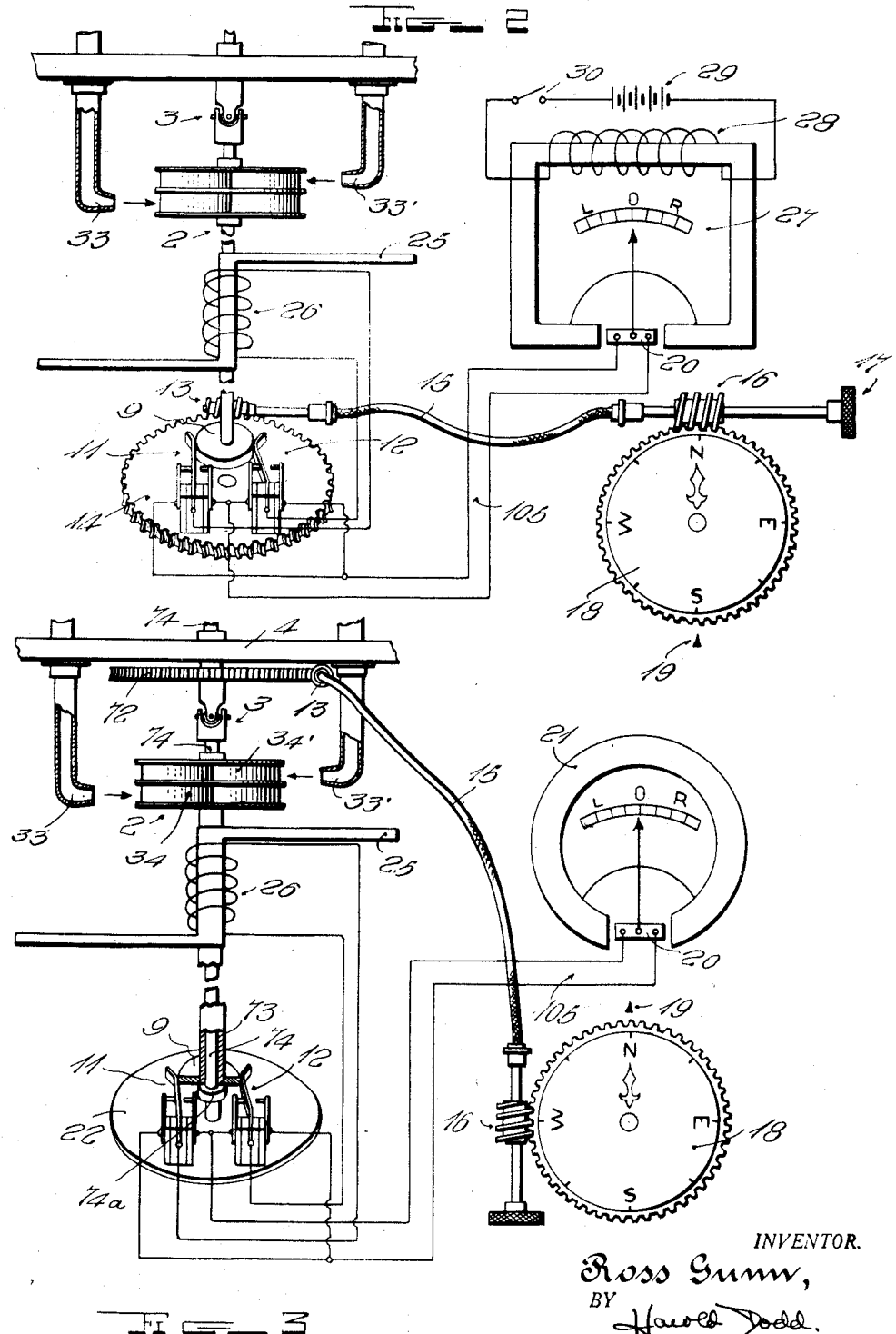

June 19, 1934.   R. GUNN   1,963,551
INDUCTOR COMPASS
Filed Nov. 12, 1929   5 Sheets-Sheet 4
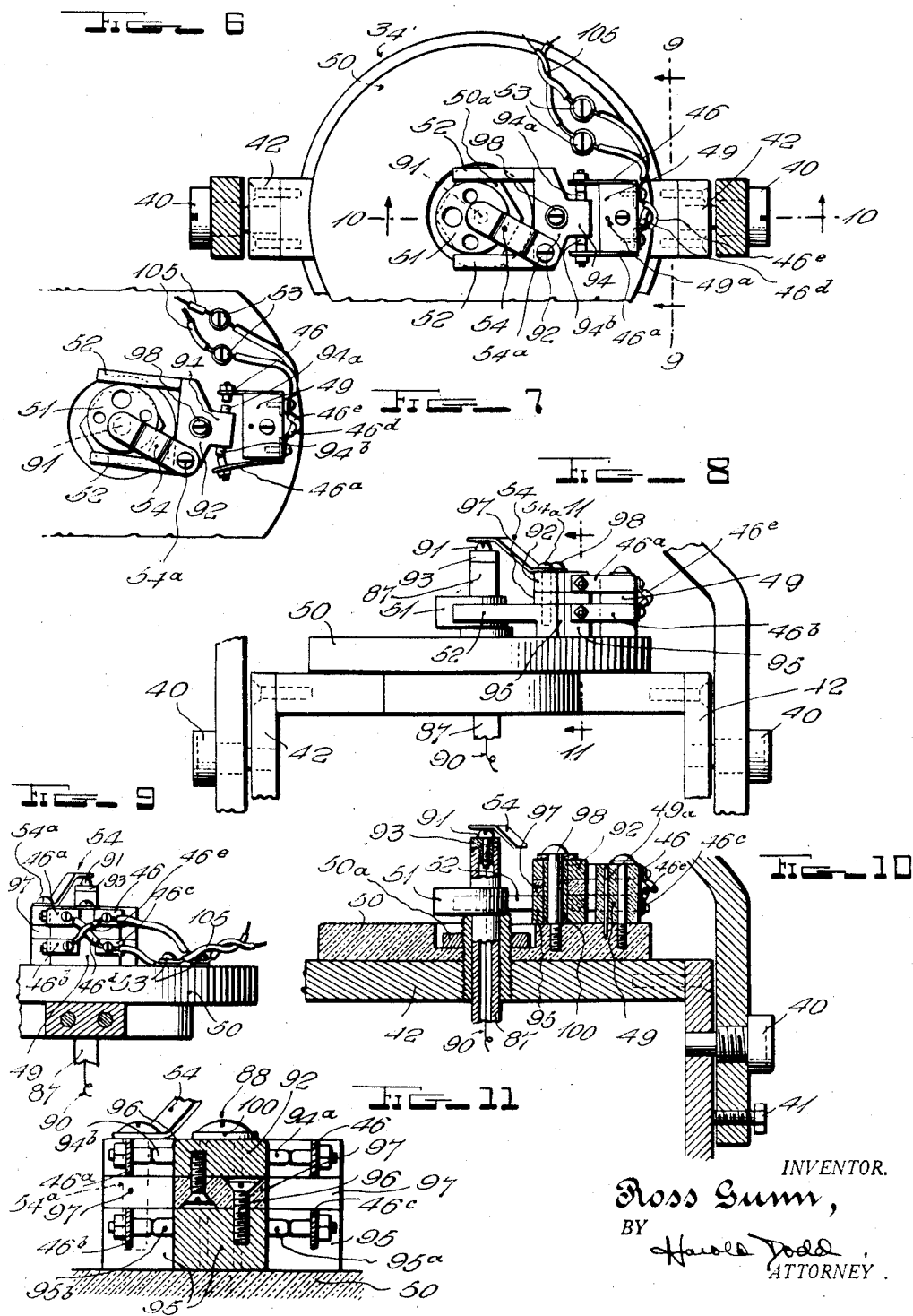
INVENTOR.
Ross Gunn,
BY Harold Todd
ATTORNEY.

June 19, 1934.  R. GUNN  1,963,551
INDUCTOR COMPASS
Filed Nov. 12, 1929    5 Sheets-Sheet 5
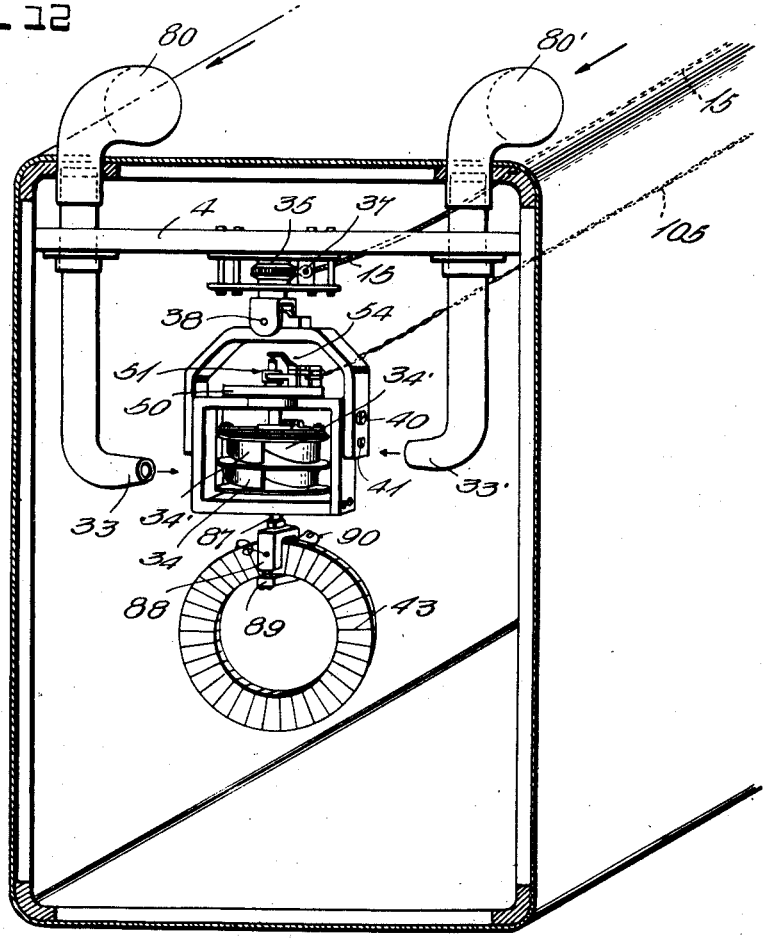
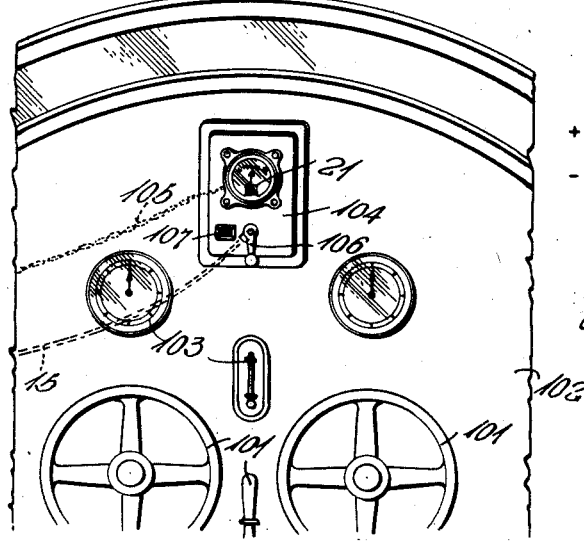
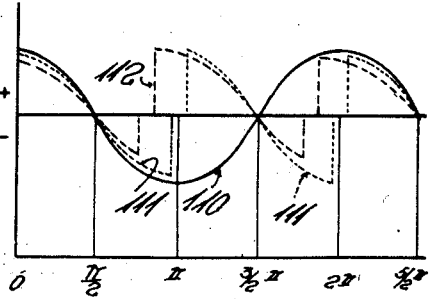
INVENTOR.
Ross Gunn,
BY
ATTORNEY Patented June 19, 1934

1,963,551

UNITED STATES PATENT OFFICE 1,963,551

INDUCTOR COMPASS

Ross Gunn, Washington, D. C., assignor to Bendix Research Corporation, East Orange, N. J., a corporation of Indiana Application November 12, 1929, Serial No. 406,702

7 Claims. (Cl. 33—204)

My invention relates broadly to inductor compasses, and more particularly to a construction and arrangement of inductor compass which may be carried aboard aircraft for accurately indicating a predetermined course for enabling a pilot to maintain a proper direction of flight at all times.

One of the objects of my invention is to provide a simplified construction of inductor compass involving a rotatably driven coil wherein a high degree of efficiency may be obtained and a line of flight accurately indicated to a pilot.

Another object of my invention is to provide a simplified construction of inductor compass having means for adjusting the position of the compass for operating an indicator according to a given direction of flight.

A further object of my invention is to provide a construction of inductor type compass, wherein the energy from the inductor is rectified for operating an indicator, the rectifying means being constructed in a form for substantially eliminating losses and rendering available at the indicator mechanism control energy for enabling a pilot to be accurately advised as to deviations from a predetermined course.

Other and further objects of my invention reside in the construction of an improved synchronous contact mechanism for an inductor compass for rectifying the alternating current generated by the inductor for actuating an indicator.

My invention will be more fully understood from the specification hereinafter following by reference to the accompanying drawings in which:

Figure 1 shows an inductor compass embodying the principles of my invention; Fig. 2 illustrates a modified form of inductor compass embodying my invention; Fig. 3 illustrates a still further modification of the inductor compass of my invention; Fig. 4 illustrates one of the preferred embodiments of the inductor compass of my invention mounted in position on an aircraft; Fig. 5 is a fragmentary cross-sectional view taken through the inductor on line 5—5 of Fig. 4; Fig. 6 is a plan view of the synchronous contact mechanism which I employ for rectifying the energy supplied from the rotating inductor; Fig. 7 is a fragmentary view illustrating one of the extreme positions of the synchronous rectifier; Fig. 8 is a side elevation of the rectifier illustrated in Fig. 6; Fig. 9 is an end view of the rectifier looking in the direction of line 9—9 of Fig. 6; Fig. 10 is a fragmentary cross-sectional view through the rectifier mechanism on line 10—10 of Fig. 6; Fig. 11 is a cross-sectional view through the rectifier mechanism on line 11—11 of Fig. 8; Fig. 12 is a perspective view showing the mounting of the inductor compass on an aircraft; Fig. 13 is a diagrammatic view showing the mounting of the control and indicator for the inductor compass on the control panel of an aircraft; Fig. 14 is an enlarged view showing the control for the inductor compass which is mounted upon the indicator panel which is positioned in front of the pilot of the aircraft remote from the driving mechanism of the inductor compass; and Fig. 15 is a theoretical view showing the theory of operation of the inductor compass of my invention.

My invention is directed to a construction of simplified earth inductor compass which is capable of indicating the correct magnetic course within one degree or less and which is free of many mechanical difficulties heretofore encountered in constructions of indicator compasses. The difficulties which are met with in practice in inductor compasses heretofore available arise largely from the fact that a high rotational speed is required and brushes operating from a commutator are not satisfactory for impressing upon an indicator sufficient energy to maintain the indicator in a continuously excited condition throughout a period of flight for permitting continuous observations. Due to the high rotational speed of previous designs the compasses were highly gyroscopic, and when the aircraft struck a bad bump serious difficulty was encountered in the stability of the indicator by the precession imposed on the rotor system of the compass. A certain amount of gyroscopic control is desirable, since it simplifies difficulties arising from damping, and it is therefore highly desirable that the rotational inertia be kept at moderate values.

It is a well known fact that any commutator system is very inefficient when the generator potentials are low, and compasses making use of such brush mechanisms must operate at high speeds in order to make up for the loss due to inefficient commutation.

The construction of inductor compass described herein has been developed with a full knowledge of the difficulties involved in available types of compasses and a simplified construction produced having a minimum number of electrical and mechanical parts mounted to permit adjustments to be made in setting the compass to a particular position with respect to a predetermined direction of flight.

Referring to the drawings in detail the principles of my invention may be understood from Figure 1, which shows schematically a complete compass installation. In this figure reference character 1 designates the inductor proper, which is rotated by suitable driving mechanism 2 and which is kept in a substantially vertical position by gravity since the system is supported by a universal joint 3 from the frame 4. The electromotive force generated by the inductor 1 is led out through suitable slip rings 5 and 6 and collectors 7 and 8 or similar contacts to the rectifier mechanism made up of a cam 9, and contacts 11 and 12 mounted on a rotatable member 14. The contacts 11 and 12 are arranged to open and close in strict synchronism with the shaft, and are operated by means of the cam 9. Thus the alternating current generated in 1 is rectified and impressed on the indicator mechanism 20—21. The rotatable member 14 which carries the contact mechanism 11 and 12 is arranged to be turned by means of the worm 13, a flexible shaft 15, another worm 16, and a knob 17. A compass card 18 is driven by the worm 16 in the manner shown and the angular positions of the brushes, with respect to the frame, are arranged to be indicated by means of the card 18 and index 19. The course may equally well be set by attaching a worm and suitable control mechanism to the fixed system 4 and rotating the whole mechanism with respect to the ship, as illustrated in Fig. 3 described hereinafter.

The indicator 20—21 is a sensitive direct current millivoltmeter. A synchronous rectifier of a type made up of the cam 9 and contacts 11 and 12, rectifies the alternating electromotive force generated by 1 in such a way that as the rectifier assembly 14 is rotated, the indicator reads to the left, for example, and as the system is rotated still further, the deflection drops to zero and reads to the right, for example, and still further rotation returns the indicator to zero and then to the left. In practice, the course to be flown with respect to the earth's magnetic field is set by appropriate selection of the position of the assembly 14, the reference position being determined by experiment. Thus when a pilot is on his course the indicator reads 0, and if he deviates to the left or right the indicator will indicate to the left or right of the zero mark.

The frame 4 from which the compass mechanism is suspended is adjacent the top of the fuselage of the aeroplane through which the air jets 33 and 33' project for conveying jets of air which operate the driving mechanism 2, as will be more fully hereinafter described. The parts of the mechanism are shown schematically mounted as a unit on a frame member 70.

Other variations of the fundamental structure of the compass are illustrated in Figs. 2 and 3. In these figures 3 is the universal joint which allows the indicator mechanism to hang vertically downward. The indicator proper is driven by any suitable source of power 2 which may, if desirable, be connected to the inductor by means of a flexible shaft or rotating universal joint. In Fig. 2 the inductor consists of a bar of magnetic material 25 of substantially the shape shown, which on rotation in the horizontal component of the earth's magnetic field sets up an alternating electromotive force in the inductor coil 26. This alternating electromotive force is connected to the rectifier mechanism 9, 11, 12 in such a manner that the cam mechanism operating in synchronism with the alternating potential rectifies it and operates the direct current indicator 20—27. The indicator in this arrangement may be made more sensitive by the addition of a polarizing winding 28 which is supplied by electrical current from a battery 29 and switch 30. The course setting mechanism 13, 15, 16, 17, 18 which is employed is similar to the mechanism described in Fig. 1. Fig. 4 shows the strictly equivalent arrangement, except in this case the entire mechanism can be rotated for the purpose of setting the course instead of rotating the contact assembly 11 and 12.

The contact mechanism 11 and 12 for the inductor compass illustrated in Fig. 3 is mounted upon an angularly movable plate 22. An adjustment of the compass is accomplished wholly by orientation of the shaft 74 under control of worm gear 13 which meshes with gear 72 secured upon the depending shaft 74, which carries plate 22 which supports the rectifier mechanism. A universal joint 3 supports shaft 74 in a vertical position concentrically positioned upon shaft 74 and supported on the step bearing 74a formed in shaft 74. I provide a sleeve 73 concentric with shaft 74 which carries cam 9 and is connected to inductor 25 and driving mechanism 2, whereby cam 9 actuates the rectifier mechanism at a selected setting determined by the movement of gear 72.

An amplifier may be introduced between the rotor generating the alternating electromotive force and the rectifier proper without altering in any way the fundamental principles involved in the compass of my invention.

The particular embodiment of my invention which I regard as a preferred construction is illustrated more particularly in Figs. 4–14. The inductor 43 is arranged to be rotated by the air motor 34, which derives its energy from air jets 33, 33', arranged opposite to each other in the manner shown so that the impinging jet will not deflect the axis of the compass from the vertical. Preferably the pipes terminating in the air jets 33 and 33' are adjustably mounted. In the construction shown they are slidably arranged in sleeves, thus permitting the egress of the air currents from their extreme ends to strike the rotor vanes substantially near the periphery thereof. The jets 33 and 33' are offset with respect to the vertical spin axis of the compass to provide the required turning movement to effect rotation. This adjustment of the air-ejecting nozzles in a vertical and horizontal plane readily enables the operator to obtain the greatest efficiency from the rotors. Any appropriate means may, of course, be resorted to. Set screws, for instance, may be advantageously employed on the confining collars immediately below the supporting frame. The frame which supports the impeller is so designed as to offer minimum obstruction with respect to the air currents issuing from the air jets 33 and 33', The air motor and inductor are swung from suitable gimbals 40 and 38, which allow the rotor system to rotate about a vertical axis. A friction control 41 is adjusted to damp out oscillations imposed on the system due to bumps encountered by the plane. The conductors leading from the inductor are connected to the frame and to the collector brush 54 secured by screw 54a upon terminal block 92, and are led to the synchronous rectifier driven by the cam 51 which operates the contacts 46, 46a, 46b and 46c, which are held by an insulated block 49. Contact strips 46a and 46c are cross-connected at 46d, while contact strips 46 and 46b are similarly cross-connected by leader 46e on block 49, thus providing for reversals in the circuit connections to the inductor for securing unidirectional current. The insulated member 50 which carries the rectifier assembly is held in place by a nut 50a in such a manner that it may be rotated about a vertical axis at will. Member 50 supports block 49 which is pinned thereto by means 49a which prevents displacement by the lateral strains thereon due to shifting of the contacts. This rotation of insulated member 50 may be used to set the course, or as in the present case, it is used to make the initial calibrating adjustment. The entire system is arranged to be turned by the worm gears 35 and 37. The two wires leading to the indicator are connected to suitable binding posts 53 and a flexible shaft 15 (Fig. 14) connected to the indicator mechanism is connected to the shaft. The other end of this flexible shaft is connected to a suitable crank or gear mechanism 106, which in turn is geared to a counter 107, whose numerals may be filled with radium paint, and which by proper selection of the gear ratios can be made to read directly the azimuth of the desired course. The gearing ratios are ordinarily chosen so that one complete turn of the worm gear 35 corresponds to a difference in reading of the indicator 21 of 360°. The indicator proper 21 is connected by a pair of wires 105 to the posts 53. In operation it is only necessary to turn the crank 106 to the desired azimuth of the selected course, and then steer the ship till the compass indicator 21 stays accurately at the center line. For example, suppose the pilot desires to steer a course directly south, he turns the crank until the counter reads 180 degrees and then turns the ship till the compass comes to the center line, and turns to the left when the ship turns left, and to the right when the ship turns right. Under these conditions he is accurately on the course and has only to maintain the zero setting. A detailed drawing of a suitable contact mechanism is shown in Fig. 6.

The air jets 33 and 33' connect to funnels 80 and 80' which extend beyond the fuselage of the aircraft and receive the inrushing air currents which are delivered at points adjacent the impeller mechanism 34. Two jets are employed substantially opposite each other and so direct the driving forces against the impeller that the axis of spin of the compass is not deflected from its normal vertical position. The impeller mechanism includes separate fan portions 34 and 34' which are driven by the air issuing from jets 33 and 33' respectively. The air motor may be regulated for constant speed operation by a centrifugal type governor mechanism, which changes the angular position of the vanes in accordance with the speed of rotation.

I have indicated the mechanism generally at 82 as comprising an arrangement of links 83 and 84 connected by spring means 84a. The links are arranged to shift the position of vanes 85 and 86 in accordance with the speed at which the impellers operate for maintaining that position at which substantially constant speed is obtained. The rotary shaft 87 extends through the frame 42 and is journaled vertically therein and carries the cam 51 adjacent the top thereof. The shaft 87 carries a metallic yoke 88 at its extremity which embraces the sides of inductor 43 which is secured to the yoke by means of insulated strip 89 which clamps the inductor in position for rotary movement about a vertical axis. The shaft 87 is hollow so that one lead 90 from the inductor 43 extends through the shaft and connects to the contact 91, which is insulated from the shaft 87 by a suitable bushing 93. The collector brush 54 provides a connection from the contact 91 to the terminal block 92. The terminal block 92 has a rearwardly projecting portion 94 which carries contacts 94a and 94b arranged to establish wiping connection with the contacts carried by resilient strips 46 and 46a. The terminal block 92 is secured in position with respect to a similar terminal block 95 but is insulated therefrom by screw members 96 which pass in opposite directions through the intermediate insulated block 97 and are countersunk therein. The insulated block 97 separates terminal block 92 from terminal block 95. The stacked blocks 92, 97 and 95 are free to angularly shift about the axis of screw member 98 which extends into block 50 and is insulated from the stacked blocks 92 and 95 by insulating sleeve and gasket 100. The block 95 extends in the form of a fork 52 embracing opposite sides of the cam 51, so that rotation of shaft 87 results in the periodic shifting of fork 52 under action of the cam 51 and the movement of terminal blocks 92 and 95, bringing about a wiping action between the contacts 94a and the aligned contact of the resilient strip 46, contact 94b and the aligned contact on resilient strip 46a, contact 95a on terminal block 95 and the aligned contact on resilient strip 46c, and contact 95b with the aligned contact on strip 46b. The periodic wiping contact operation serves to rectify the energy delivered by the inductor 43. The wiping contact system provides an efficient form of rectifier for the inductor compass, inasmuch as the connections between the indicating meter and the inductor coil are positively made and broken and the alternating current generated in the inductor coil rectified and supplied to the indicating meter.

The orientation of the contact system of the rectifier in Figs. 1, 2 and 3 or the orientation of the suspension frame in Fig. 12 may be readily controlled from the instrument panel of the aircraft, as illustrated in Fig. 13. The aircraft controls are designated generally at 101. The instrument panel is shown at 102 including various instrumentalities 103. The indicating meter 21 is set in panel member 104 and connected through conductors 105 with the rectifying system of the inductor compass. The orientation control device is illustrated in the form of a crank 106 which drives the flexible shaft 15 and connects to the orientation mechanism of the inductor compass. A counter illustrated at 107 is set into the panel 104 to indicate the setting of the course mechanism. By operation of the crank 106 the inductor compass may be set in the required position to enable the pilot to follow a predetermined course.

The theory of operation of the inductor compass of my invention is as follows:

The maximum average current $i$ through the indicating meter is given aproximately by $$i = \frac{4NH_o nA}{10^8 R} \quad \text{(a)}$$

where N is the number of turns in the inductor coil, A the mean area of the coil, $n$ the number of revolutions at which the coil rotates per second, $H_o$ the horizontal magnetic field intensity and R the resistance of the entire indicator and inductor circuit. The above expression gives the largest current obtainable and corresponds to an adjustment of the contact rectifier mechanism which rectifies completely the alternating currents set up in the inductor coil. By shifting the rectifier mechanism through 90 degrees without shift in position of the rest of the compass the indicator will read zero, and if rotated 90 degrees more in the same direction the indicator will read maximum current but with current in the reverse direction. In practice the contacts are usually adjusted with respect to the magnetic field in such a manner that when flying on a predetermined course the instrument reads zero. In this position deviations from the set course to left or right produce average currents through the inductor which are in one direction or the reverse and produce thereby an indication to the left or right. These deflections indicate to the pilot which way to turn to correct his line of flight. It should, perhaps, be pointed out that the meter can read zero without the current through it being zero. A direct current galvanometer or indicator of the type used in this invention has a certain amount of mechanical inertia and indicates not the instantaneous current but the average current flowing, the time over which the current is averaged being of the order of 1 second. Thus in the present device the relative position of the rectifier mechanism with respect to the magnetic field which shows zero indication on the meter does not correspond to zero current but to zero average current. This will be more readily understood by reference to Fig. 15.

In this figure the curve having a solid line 110 represents the instantaneous current generated by the inductor coil plotted as a function of the angular position of the plane of the inductor coil with respect to the vertical north south magnetic plane. The instantaneous current is sinusoidal, and if complete rectification is desired the rectifier contacts are operated at $\pi/2$ and $3/2\pi$. Ordinarily, however, when the pilot is on his course the contacts operate at angular positions $\pi$ and $2\pi$. The instantaneous current through the indicator is then approximately that shown by the dotted curve 111. The zero current for a small angle at the point of rectification arises from the fact that the indicator is short circuited for this period. It is evident from Fig. 15 that the average current through the indicator is zero for the particular setting of the rectifier contacts which was chosen. Now, if the relative positions of the magnetic field and rectifier contacts position change, due for example to a change in the vehicle's course, so that the contacts operate at $\tfrac{3}{4}\pi$ and $1\tfrac{3}{4}\pi$, for example, the mean current is no longer zero but is positive and is the average value of the dot and dash curve shown at 112. It is evident that if the contacts are arranged to operate at $1\tfrac{1}{4}\pi$ and $2\tfrac{1}{4}\pi$ then the average current through the indicator will be negative. It is clear in the light of the foregoing that such an arrangement will indicate accurately the relative position of the contact mechanism to an impressed magnetic field, that is, it is suitable for use as a compass.

The inductor compass is installed in a suitable position on the craft and driven at its predetermined speed while the craft is headed in a certain known direction, as for example north. The contact mechanism is oriented with respect to the craft until the meter reads zero and the course setting device adjusted to north for example. The craft is then turned to the left and the polarity of the indicator arranged so that the pointer moves to the left, for example. The craft is then turned to head south, for instance, and the meter should read zero again. If it does not, a stray magnetic field is indicated which can be compensated by well known methods. After compensation the course setting mechanism is set to any desired azimuth and the pilot simply steers his craft in such a manner as to keep the indicator on its zero position.

From a consideration of the equation given above it is evident that for high efficiency it is desirable that the circuit resistance be kept at an absolute minimum. Experiment has determined that the contact system of my invention reduces the effective resistance of the mechanism to that degree required for high efficiency operation. The very low voltages such as are established in the inductor compass require a contact system of high efficiency such as has been developed in connection with my construction of inductor compass as hereinbefore described. The arrangement of contacts is such that the calibration of the instrument will be maintained for the conditions of contact are constant.

The inductor compass of my invention has been found to be extremely practical in its construction and successful and efficient in its operation, and while I have described preferred embodiments of my invention, I desire that it be understood that modifications may be made within the scope of the appended claims without departing from the spirit of my invention.

What I claim as new and desire to secure by Letters Patent of the United States is as follows:

1. An inductor compass comprising a suspension frame, means for supporting said suspension frame, a rotatable shaft journaled vertically in said suspension frame, an inductor carried by said shaft, means for rotatably driving said inductor, a synchronous rectifier supported by said suspension frame and comprising sets of fixed contacts and a shiftable contact member periodically controlled in accordance with the rotation of said shaft for alternately establishing contact with said sets of fixed contacts for completing connections from said inductor to said fixed contacts synchronously with the rotation of said inductor, an indicating meter connected with said contacts and means for orienting said suspension frame with respect to said supporting means for selectively operating said indicating meter.

2. In an inductor compass, a supporting structure, a suspension frame depending from said supporting structure, an auxiliary frame variable on a horizontal axis in said suspension frame, a shaft member journaled in said auxiliary frame in a position to be gravitationally maintained in a vertical axis in alignment with the suspension of said suspension frame, an inductor carried by said shaft, driving means supported by said auxiliary frame and connected to said shaft for imparting rotary movement thereto, a synchronous rectifier supported on said auxiliary frame and including shiftable make-and-break contacts and a cam member therefor operated in synchronism with the rotation of the shaft, an indicator connected with said inductor through said synchronous rectifier, and means for selectively orienting said suspension frame.

3. In an inductor compass, a shaft member gravitationally oriented in a vertical axis, means for rotating said shaft member, an inductor carried by said shaft member, a set of stationary contacts fixed in position with respect to said inductor, a set of angularly movable contacts periodically shiftable in position to and from engagement with the stationary contacts, means for operating the movable contacts in accordance with the rotation of said inductor for establishing wiping connection with said sets of fixed contacts, one of said sets of contacts being yieldably mounted to cause said connection to be a wiping connection, an indicating meter, and connections between said indicating meter and said inductor through said sets of fixed and angularly shiftable contacts.

4. An inductor compass comprising means for gravitationally orienting a rotary shaft in a vertical position, driving means connected to said shaft, an inductor carried by said shaft, a set of stationary contacts fixed in position with respect to the movement of said inductor, a set of angularly movable contacts arranged for movement to and from engagement with the stationary contacts, one of said sets of contacts being yieldable so that the movable contacts cooperatively wipe said fixed contacts, a cam device carried by said shaft for imparting angular movement to said sets of angularly movable contacts, an indicating meter and connections between said inductor and said indicating meter through said sets of fixed and angularly movable contacts whereby alternating current generated by said inductor is rectified for the actuation of said indicating meter.

5. In an inductor compass, a rotatable shaft member, means for gravitationally orienting said rotatable shaft member in a vertical position, an inductor, means for mechanically supporting said inductor with respect to said shaft member, an electrical connection between one side of said inductor and said supporting means, an electrical connection extending through and insulated from said shaft to the other side of said inductor, a set of stationary contacts fixed in position with respect to the movement of said inductor, a set of angularly shiftable contacts one of said sets of contacts being yieldable so that the shiftable contacts establish cooperative wiping connection with said sets of stationary contacts, means for periodically moving said angularly shiftable contacts into contact with said stationary contacts in accordance with the rotation of said shaft, the conductor extending through said shaft terminating in a connection at the end thereof insulated from said shaft, a brush establishing contact with said connection, an indicating meter and connections between said indicating meter and said inductor through said brush and sets of stationary and angularly shiftable contacts.

6. In an inductor compass for aircraft and the like, an inductor, means for rotating the inductor in the earth's magnetic field to generate an alternating current, a rectifier mechanism for said inductor including stationary contacts and oscillating contacts movable to and from engagement with the stationary contacts, means operated in synchronism with the inductor for operating the oscillating contacts, and means for indicating the relative position of the contact mechanism to the earth's magnetic field.

7. In an earth inductor compass for aircraft and the like, the combination of a fixed frame, an auxiliary frame universally suspended from said fixed frame and adapted to be oriented with respect thereto, a rotatable hollow shaft extending vertically through said auxiliary frame and adapted to be maintained in its vertical position by the universal suspension of said auxiliary frame, means for driving said shaft, an earth inductor armature carried at the lower end of the shaft for generating an alternating current upon rotation thereof in the earth's magnetic field, one end of the winding of said armature being electrically connected to said hollow shaft and the other end of said winding being connected to a terminal secured to the opposite end of the shaft but insulated therefrom, a contact rectifier associated with said other end of the shaft and comprising a cam secured to and rotatable with the shaft, a U-shaped member pivotally mounted on the auxiliary frame and adapted to be actuated by the cam, a pair of movable contacts adapted to be actuated by said U-shaped member and cooperating with a pair of fixed contacts carried by the auxiliary frame, a brush carried by the U-shaped member but insulated therefrom and engaging the terminal on the end of the shaft, one of said movable contacts being connected to said U-shaped member and the other movable contact being connected to said brush, whereby upon rotation of said shaft the alternating current from the coil is rectified by alternate engagement of said movable contacts with said fixed contacts, an indicator electrically connected to said fixed contacts for giving a zero average current indication when the craft is on its course, and means for orienting the auxiliary frame with respect to the fixed frame for adjusting the position of the rectifier mechanism whereby a course may be set for which the indicator will give the zero average current indication.

ROSS GUNN.